US011810175B1

(12) United States Patent
Horesh et al.

(10) Patent No.: US 11,810,175 B1
(45) Date of Patent: Nov. 7, 2023

(54) METHOD AND SYSTEM FOR GENERATING AN OPTIMUM IDENTIFIER FORMAT

(71) Applicant: Intuit Inc., Mountain View, CA (US)

(72) Inventors: Yair Horesh, Kfar-Saba (IL); Noga Noff, Pardes-Hanna (IL); Omer Wosner, Naale (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/877,683

(22) Filed: Jul. 29, 2022

(51) Int. Cl.
*G06Q 30/00* (2023.01)
*G06Q 30/0601* (2023.01)
*G06Q 10/04* (2023.01)

(52) U.S. Cl.
CPC ......... *G06Q 30/0627* (2013.01); *G06Q 10/04* (2013.01)

(58) Field of Classification Search
CPC .......................... G06Q 30/0627; G06Q 10/04
USPC ....................................................... 705/26.5
See application file for complete search history.

(56) References Cited

U.S. PATENT DOCUMENTS

| 2010/0228604 A1* | 9/2010 | Desai | G06Q 30/0205 705/7.34 |
| 2019/0220914 A1* | 7/2019 | Flannery | G06Q 30/0629 |
| 2020/0409936 A1* | 12/2020 | Salkola | G10L 15/1822 |

OTHER PUBLICATIONS

Probst, K., Ghani, R., Krema, M., Fano, A.E. and Liu, Y., August. Semi-Supervised Learning of Attribute-Value Pairs from Product Descriptions, 2007, In IJCAI, vol. 7, pp. 2838-2843. (Year: 2007).*
Baskoro, "Neural Network Embedding for SKU Representation in Mapa," Medium.com, retrieved from the Internet on May 16, 2022 at [https://medium.com/@jatmiko.budi/neural-network-embedding-for-sku-representation-in-mapan-c0bc20951b9e], published May 21, 2019, 4-pages (Year: 2019).
Lightspeed HQ, SkuVault, Integrations, retrieved from the Internet on May 16, 2022 at [https://www.lightspeedhq.com/integrations/skuvault/], 4-pages.

* cited by examiner

Primary Examiner — Allison G Wood
Assistant Examiner — Brittany E Bargeon
(74) Attorney, Agent, or Firm — Paradice & Li LLP

(57) ABSTRACT

Systems and methods for optimally formatting item identifiers (ID) are disclosed. An example method is performed by one or more processors of a system and includes obtaining descriptions of items, identifying, for each item, one or more attributes of the item described in the item's description, extracting a value for each of the identified attributes, identifying a set of common attributes among the identified attributes for which values were extracted for more than a threshold ratio of the items, assigning a priority weight to each of the common attributes using an optimization algorithm, identifying a set of optimum attributes among the set of common attributes based on the priority weights, mapping an optimum code to each unique value extracted for the optimum attributes, and generating an optimum ID format that provides, for each item, a unique ID including the optimum codes mapped to the values of the item's optimum attributes.

20 Claims, 5 Drawing Sheets

METHOD AND SYSTEM FOR GENERATING AN OPTIMUM IDENTIFIER FORMAT

TECHNICAL FIELD

This disclosure relates generally to formatting item identifiers (IDs), and specifically to training and/or using a trained model in conjunction with a named-entity recognition (NER) engine to generate an optimum ID format for a set of items given the items' descriptions.

DESCRIPTION OF RELATED ART

As used herein, an "item" refers to a data object representative of an individual article, such as an individual item collected by a user (e.g., statuettes, cards in a personal collection, digital content, etc.), managed by a user (e.g., inventory in a warehouse), sold by a user (e.g., products in a line), or the like. Many users maintain various information about their items in a table or database, such as the items' locations, descriptions, characteristics, quantities, or the like. Often, the users assign identifiers (IDs) to the items in an effort to facilitate generating insights about the items, tracking the items, integrating the items into various platforms, and/or communicating with interested parties, such as other collectors, sellers, buyers, warehouses, e-commerce sites, or other suitable interfaces or platforms that can be used for analyzing, organizing, marketing, or managing various items, such as the QuickBooks®, Mint®, Credit Karma®, and Mailchimp® platforms.

However, custom IDs often have no standard formatting requirements—including the commonly used stock keeping unit (SKU)—thus, item ID formats tend to vary greatly among users, even within a user's own items. When item IDs are poorly structured (such as by being excessively long, inconsistent among items, difficult to comprehend, etc.), difficulties tend to arise, such as multiple items having a same ID, some items having no ID, duplicate items, lost items, unnecessary purchases, sales mistakes, interface errors, communication failures, and so on. Even if a user generates detailed descriptions for their items, using a suboptimal item ID format (or forgoing the use of IDs altogether) generally results in frustration, confusion, wasted time and effort, errors in tracking, failures in communication, misleading statistics, and the like.

Given such difficulties, there is a need for a computer-based system that can help users develop a reliable and meaningful nomenclature for identifying their items, and to be well-equipped to effectively manage the items, generate useful insights about the items, and successfully coordinate with other collectors, e-commerce sites, item management platforms, etc.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for generating an optimum format for identifying items. An example method is performed by one or more processors of a system and include obtaining a plurality of descriptions each describing one of a plurality of items, identifying for each item, using a named-entity recognition (NER) engine, one or more attributes of the item described in the item's description, extracting, using the NER engine, a value for each of the identified attributes, identifying, among the identified attributes, a set of common attributes for which values were extracted for more than a threshold ratio of the items, assigning, using an optimization algorithm, a priority weight to each of the common attributes, identifying a set of optimum attributes among the set of common attributes based on the priority weights, mapping an optimum code to each unique value extracted for the optimum attributes, and generating an identifier (ID) format that provides, for each item, a unique ID including the optimum codes mapped to the values of the item's optimum attributes.

Another innovative aspect of the subject matter described in this disclosure can be implemented in a system for generating an optimum format for identifying items. An example system includes one or more processors and a memory storing instructions for execution by the one or more processors. Execution of the instructions causes the system to perform operations including obtaining a plurality of descriptions each describing one of a plurality of items, identifying for each item, using a named-entity recognition (NER) engine, one or more attributes of the item described in the item's description, extracting, using the NER engine, a value for each of the identified attributes, identifying, among the identified attributes, a set of common attributes for which values were extracted for more than a threshold ratio of the items, assigning, using an optimization algorithm, a priority weight to each respective common attribute, identifying a set of optimum attributes among the set of common attributes based on the priority weights, mapping an optimum code to each unique value extracted for the optimum attributes, and generating an identifier (ID) format that provides, for each item, a unique ID including the optimum codes mapped to the values of the item's optimum attributes.

Another innovative aspect of the subject matter described in this disclosure can be implemented as a non-transitory computer-readable medium storing instructions that, when executed by one or more processors of a system for generating an optimum format for identifying items, cause the system to perform operations. Example operations include obtaining a plurality of descriptions each describing one of a plurality of items, identifying for each item, using a named-entity recognition (NER) engine, one or more attributes of the item described in the item's description, extracting, using the NER engine, a value for each of the identified attributes, identifying, among the identified attributes, a set of common attributes for which values were extracted for more than a threshold ratio of the items, assigning, using an optimization algorithm, a priority weight to each respective common attribute, identifying a set of optimum attributes among the set of common attributes based on the priority weights, mapping an optimum code to each unique value extracted for the optimum attributes, and generating an identifier (ID) format that provides, for each item, a unique ID including the optimum codes mapped to the values of the item's optimum attributes.

Another innovative aspect of the subject matter described in this disclosure can be implemented as a method for training a model to extract attribute values from an item's description. An example method is performed by one or more processors of a system and include retrieving a plurality of sample descriptions each describing one of a plurality of items, identifying, for each item, one or more attributes of the item described in the item's sample description, extracting, from the sample descriptions, a value for each of the identified attributes, generating attribute-value pairs (AVPs) each indicating one of the attributes, the value extracted for the attribute, and a confidence that the extracted value correctly identifies the attribute for the associated item, generating model training data based on the AVPs and a set of labels assigned to the sample descriptions, and generating, using the model training data in conjunction with a named-entity recognition (NER) engine, a model trained to extract, from a given item's description, a value for one or more predefined attributes of the given item.

Another innovative aspect of the subject matter described in this disclosure can be implemented in a system for training a model to extract attribute values from an item's description. An example system includes one or more processors and a memory storing instructions for execution by the one or more processors. Execution of the instructions causes the system to perform operations including retrieving a plurality of sample descriptions each describing one of a plurality of items, identifying, for each item, one or more attributes of the item described in the item's sample description, extracting, from the sample descriptions, a value for each of the identified attributes, generating attribute-value pairs (AVPs) each indicating one of the attributes, the value extracted for the attribute, and a confidence that the extracted value correctly identifies the attribute for the associated item, generating model training data based on the AVPs and a set of labels assigned to the sample descriptions, and generating, using the model training data in conjunction with a named-entity recognition (NER) engine, a model trained to extract, from a given item's description, a value for one or more predefined attributes of the given item.

Another innovative aspect of the subject matter described in this disclosure can be implemented as a non-transitory computer-readable medium storing instructions that, when executed by one or more processors of a system for training a model to extract attribute values from an item's description, cause the system to perform operations. Example operations include retrieving a plurality of sample descriptions each describing one of a plurality of items, identifying, for each item, one or more attributes of the item described in the item's sample description, extracting, from the sample descriptions, a value for each of the identified attributes, generating attribute-value pairs (AVPs) each indicating one of the attributes, the value extracted for the attribute, and a confidence that the extracted value correctly identifies the attribute for the associated item, generating model training data based on the AVPs and a set of labels assigned to the sample descriptions, and generating, using the model training data in conjunction with a named-entity recognition (NER) engine, a model trained to extract, from a given item's description, a value for one or more predefined attributes of the given item.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
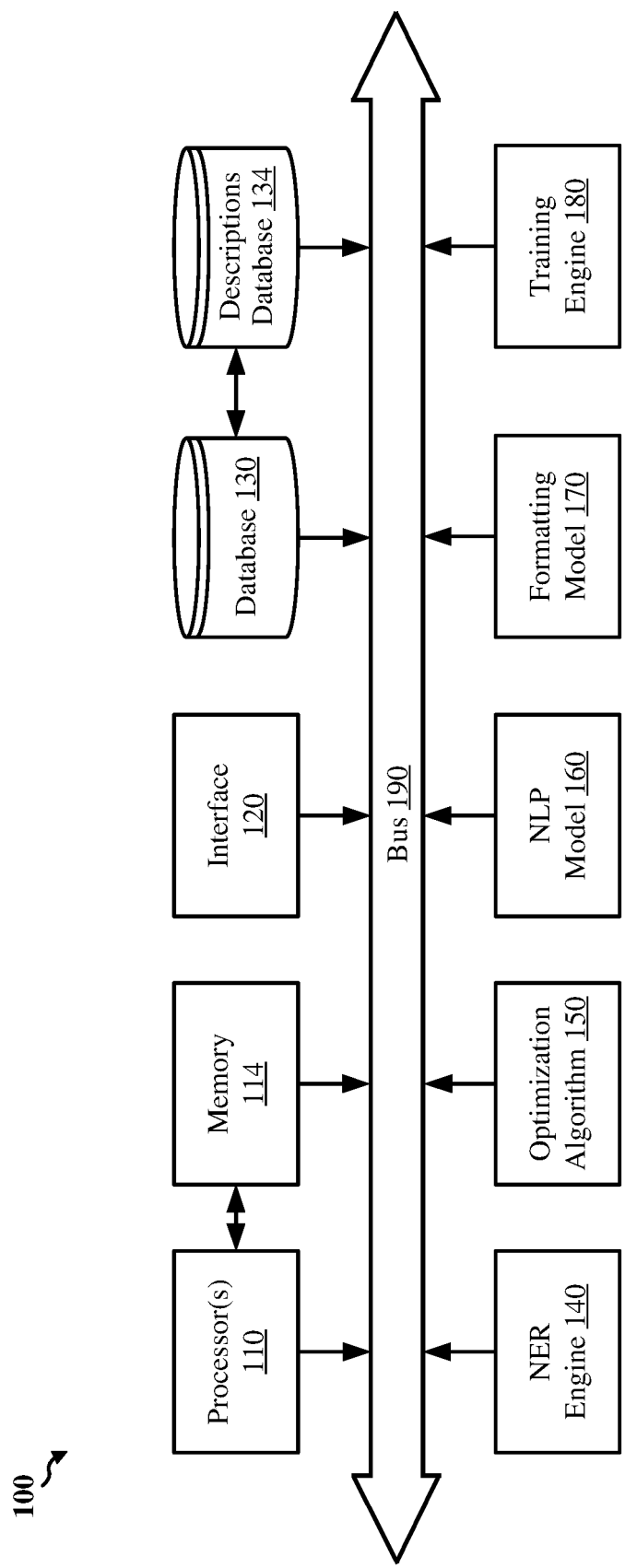
FIG. 1 shows a system, according to some implementations.

Defining a well-structured nomenclature for item identifiers (IDs) poses a huge technical challenge for users that manage items (e.g., in a collection, product line, inventory, etc.) and wish to manage the items in a database, such as in connection with a computer-based item management system or e-commerce platform. The conventional solution for users has been to develop a custom ID format manually, which is often laden with inconsistencies, devoid of meaning, and results in confusion, errors, and miscommunications, particularly because custom IDs often have no standard formatting requirements. Although some conventional systems assist users in tracking their items' IDs, there is a need for a computer-based system that can assist a user in defining an ID format that provides a statistically most effective ID for each of the user's items, and enables the user to effectively manage the items, generate useful insights, and reliably communicate with other interested parties.

Implementations of the subject matter described herein are directed to solving these technical challenges by extracting information from descriptions of a user's items and using the extracted information to provide an optimum item ID format custom-tailored for the user based on the items' characteristics. Specifically, aspects of the present disclosure provide systems and methods for generating an optimum ID format that defines a unique, concise, and meaningful ID for each item, and can be used in real-time to generate similarly formatted IDs for items added in the future. In some implementations, the optimum item ID format is generated by using a trained named-entity recognition (NER) engine to extract values from the items' descriptions defining the items' unique characteristics, using an optimization algorithm in conjunction with a natural-language processing (NLP) model to map codes to the extracted values, and using the codes to generate an optimum ID format that provides a unique ID for each item representing the item's defining characteristics in a statistically most meaningful and concise manner. In some other implementations, a model is trained to extract particular attribute values from item descriptions.

Various implementations of the subject matter described in this disclosure provide one or more benefits such as identifying locations of particular attribute values in item descriptions, using aspects of a NER engine to extract values for the attributes, assigning weights indicating a relative priority of attributes, identifying the most distinguishing attributes for a given set of items, determining optimum codes for mapping to unique attribute values, recommending optimum item IDs and/or codes for a user's items or for one or more categories of the user's items, generating an ID format custom-tailored for the user's items and/or categories, using an optimization algorithm to search a compact representation of IDs and/or codes, notifying a user of inconsistencies in an item's description, allowing a user to impute missing attribute values, allowing a user to modify values or descriptions that are unclear or associated with a confidence below a value, determining an optimum ordering for codes in a given ID, maintaining custom configuration data for generating IDs for a user's new items, generating AVPs based on values extracted from item descriptions, annotating the item descriptions, generating training data to further train the model based on the annotated descriptions, and so on. Implementations of the subject matter described in this disclosure also provide one or more benefits such as improving user experience (UX), enhancing workflow, reducing errors, reducing system processing and memory resources, increasing user satisfaction and retention, preventing duplicate or missing item IDs, preventing mistakes in sales or purchases, reducing user time and effort, and improving communication and coordination among users, interested parties, and various item-management platforms, among other benefits.

For purposes of discussion herein, an "item" refers to a data object representative of an individual article, such as one of a plurality of objects included in a collection, a list of products, an inventory, or the like. For purposes of discussion herein, a "description" refers to data (e.g., text) representative of one or more attributes of a corresponding item. For purposes of discussion herein, an "attribute" of an item refers to the item's category, type, size, color, rarity, or other relevant characteristic of the item, as further described below. For purposes of discussion herein, an "ID" of an item refers to a sequence of characters used to uniquely identify the item among other items, such as particular categories of items, or any suitable set of items stored in a database, used on a platform, communicated between parties, transferred over an interface, or the like. For purposes of discussion herein, an ID "format" refers to a defined structure or pattern for generating or otherwise providing unique character sequences used to identify each item in a given set, such as a set of optimized codes that uniquely identify each item based on its most distinguishing attributes. For purposes of discussion herein, an "optimum" format, attribute, code, or order refers to a format, attribute, code, or order predicted (e.g., by the system) to have a highest likelihood of resulting in a most favorable outcome for the associated user given current data, such as an ID format that provides advantageously arranged, concise, and meaningful item IDs representative of the statistically most relevant attributes of the identified item. In some instances, the "optimum" format, attribute, code, or order (as predicted by the system) is determined or modified based on one or more instructions from a user.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing techniques for formatting IDs. Implementations of the subject matter disclosed herein provide specific inventive steps describing how desired results are achieved and realize meaningful and significant improvements on existing computer functionality—that is, the performance of systems for use in the evolving technological field of using machine learning techniques to characterize data objects.

FIG. 1 shows a system 100, according to some implementations. Various aspects of the system 100 disclosed herein are generally applicable for generating an optimum format for identifying items, training a model to extract attribute values from an item's description, or both. The system 100 includes a combination of one or more processors 110, a memory 114 coupled to the processor 110, an interface 120, one or more databases 130, a descriptions database 134, a named-entity recognition (NER) engine 140, an optimization algorithm 150, a natural-language processing (NLP) model 160, a formatting model 170, and/or a training engine 180. In some implementations, the various components of the system 100 are interconnected by at least a data bus 190, as depicted in the example of FIG. 1. In some other implementations, the various components of the system 100 are interconnected using other suitable signal routing resources. While the system 100 and the examples herein are generally described with reference to generating optimally formatted item IDs, aspects of the present disclosure may be used to perform other optimization and/or formatting techniques, among other suitable tasks.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for receiving input data and/or instructions from a user, outputting data to a user, presenting information to a user, detecting an action of a user, receiving a command from a user, determining a selection made by a user, prompting a user to perform one or more actions, receiving or obtaining data objects (e.g., item descriptions) from a user, transferring or providing data objects (e.g., item IDs) to a user, obtaining values from a user, obtaining refined text from a user, or the like. In some implementations, the interface 120 is used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as data objects (e.g., descriptions, attributes, IDs, etc.), weights, models, engines, algorithms, user information, attribute-value pairs (AVPs), values, entities, labels, annotations, user configuration data, training data, validation data, user information, features and/or feature values, loss functions, among other suitable information, such as in one or more JavaScript Object Notation (JSON) files or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the descriptions database 134 and/or another suitable physical or cloud-based data store. In some implementations, the database 130 includes a relational database capable of presenting information as data sets in tabular form and capable of manipulating the data sets using relational operators.

The descriptions database 134 stores data associated with formatting item IDs, such as data objects (e.g., item descriptions from one or more users, stock keeping units (SKUs), annotations, user configuration data, predefined attributes, dictionaries, etc.) or other data representative of item IDs, AVPs, attributes, descriptions, weights, models, engines, algorithms, user information, or the like. In some instances, the predefined attributes are stored in a table including a column for each predefined attribute and a row for each item, where the row indicates ones of the predefined attributes described in the item's description. In various implementations, the descriptions database 134 is a part of or separate from the database 130. In some instances, the descriptions database 134 includes data stored in one or more cloud object storage services, such as one or more Amazon Web Services (AWS)-based Simple Storage Service (S3) buckets. In some implementations, all or a portion of the data is stored in a memory separate from the descriptions database 134, such as in the database 130 or another suitable data store.

The NER engine 140 is used to identify locations within item descriptions that store values for particular attributes of the items. In some implementations, the NER engine 140 incorporates one or more aspects of Stanford's NER, AWS Comprehend, or another suitable multi-label classifier for locating named entities in fields of a text, classifying the entities into categories based on values extracted from the fields, and generating output indicating the classifications. For purposes of discussion herein, the NER engine 140 identifies locations for one or more particular attributes in an item's description, extracts ones of the values, and generates a number of AVPs each indicating one of the attributes, the value extracted for the attribute, and in some instances, a confidence that the value is correct, such as a predicted likelihood that the value correctly identifies the attribute of the particular item. In some instances, the NER engine 140 indicates 'null' (or '0' or another suitable indication of an empty element or value) for values of the particular attributes deemed missing and/or inapplicable to an item, such as attribute values for which a location is unknown, for which the extracted value is associated with a confidence below a threshold, for items belonging to one or more specified categories, or based on an instruction from the user, the user's configuration data, and/or a context of the item's description, as further described below in connection with the optimization algorithm 150 and the NLP model 160.

In some instances, the NER engine 140 discards or refrains from extracting values associated with a confidence less than a value. In some of such instances, the system 100 indicates that such values are missing and solicits (e.g., from the user) a replacement value for one or more missing values. In other instances, the system 100 obtains (e.g., from the user) one or more replacement descriptions associated with the items with missing attribute values. In some implementations, the system 100 refrains from soliciting a replacement value or a refined description until determining that the corresponding attribute appears in more than a threshold ratio of the user's items or items in a particular category or group of categories.

In some instances, the NER engine 140 identifies a same set of predefined attributes for all of a user's items, such as if the items are all in a same category, are not split into categories, or the user instructs the system 100 to (at least attempt to) identify the same attributes in each item's description. In some other instances, one or more different sets of predefined attributes are used for items in particular categories (or groups of categories) in a hierarchical manner, such as a first set of predefined attributes for items in a "shoe" category (e.g., "size," "color," and "material") and a second set of predefined attributes for items in a "hat" category (e.g., "style" and "color"). In yet other instances, different subsets of predefined attributes are used within a same category of items, such as in one or more subbranches of the hierarchy.

In a non-limiting example, the system 100 defines a first set of predefined attributes for the user's items in the "shoe" category that are of a "boot" type, a second set of predefined attributes for the user's items in the "shoe" category that are of a "sandal" type, a third set of predefined attributes for the user's items in the "hat" category having a "fedora" type, a fourth set of predefined attributes for the user's items in the "hat" category having a "straw" type, and a fifth set of predefined attributes for all of the user's items in the "cane" category. In a non-limiting example, a user provides descriptions for a set of collectables in a "movie" category, for which a custom set of attributes is defined. For this example, the custom set of attributes includes a "category" attribute, a "type" attribute, a "title" attribute, a "year" attribute, a "rating" attribute, a "duration" attribute, and a "language" attribute, and the values extracted from an example item's description include "movie," "VHS," "The Wizard of Oz," "1939," "G," "102," and "English," respectively. Thus, for this example, the NER engine 140 generates a set of corresponding AVPs (in any suitable format), indicating {"category": "movie", "type": "VHS", "title": "The Wizard of Oz", "year": "1939", "rating": "G", "duration": "102", "language": "English"}. In some instances, one or more of the predefined attributes is a binary value, such as a "sealed" attribute, where a value of "1" indicates that the NER engine 140 predicts that the item is sealed in its original packaging, and a value of "0" indicates that the NER engine 140 predicts that the item is not sealed in its original packaging. It is to be understood that, in various implementations, the predefined attributes include any suitable item attribute for which a value may be extracted.

In another non-limiting example, a same set of predefined attributes is used for all items and includes a category attribute, a type attribute, a size attribute, a color attribute, a rarity attribute, a source attribute, a material attribute, a container attribute, an amount attribute, a design attribute, a theme attribute, a collection set attribute, a level attribute, a quantity attribute, and a custom term attribute. For this example, given an item's description, the NER engine 140 (at least attempts to) extract values representative of the item's category (e.g., shoes), type (e.g., boot), size (e.g., 4), color (e.g., black), rarity (e.g., null), source (e.g., Italy), material (e.g., leather), container (e.g., box H4), amount (e.g., 83.99), design (e.g., plain), theme (e.g., dark), collection set (e.g., null), level (e.g., null), quantity (e.g., 2), and/or custom term (e.g., D8), respectively. Thus, for this example, the NER engine 140 generates a set of corresponding AVPs (in any suitable format), indicating {"category": "shoes", "type": "boot", "size": "4", "color": "black", "rarity": "null", "source": "Italy", "material": "leather", "container": "box H4", "amount": "83.99", "design": "plain", "theme": "dark", "collection set": "null", "level": "null", "quantity": "2", "custom term": "D8"}. In some instances, each AVP includes a confidence value indicating a predicted likelihood that the extracted value correctly identifies the item's attribute. For instance, the AVPs {"source": "Italy": "0.64"} and {"material": "leather": "0.98"} indicate that the NER engine 140 is 64% certain that the item is from Italy and 98% certain that the item is made of leather; thus, if the confidence threshold is 0.94 (or another suitable value not less than 0.64), the NER engine 140 discards the "Italy" value and, in some instances, obtains a replacement value from the user, obtains a refined description from the user, replaces the discarded value with a value from a similar item's description, and/or refrains from replacing the value (such as based on an instruction from the user).

The optimization algorithm 150 is used in conjunction with the NLP model 160 to assign a priority weight to each potential attribute for use in identifying a particular set of items. In some implementations, the optimization algorithm 150 incorporates one or more aspects of a genetic algorithm (GA), an evolutionary algorithm (EA), a stochastic gradient descent (SGD) technique, a simulated annealing technique, or another suitable search optimization technique. In some instances, relatively higher weights are assigned to attributes deemed relatively more effective for distinguishing the items, such as among all of the user's items, within a particular set of the user's item categories, and/or among one or more other users' items. In some other instances, relatively higher weights are assigned to attributes for which values are extracted from a relatively high ratio of the items' descriptions, and relatively lower weights are assigned to attributes for which values are extracted from a relatively low ratio of the items' descriptions. In a non-limiting example, values for the "color" attribute are identified in a relatively high ratio of items in a particular category (e.g., "shoes"), and thus the optimization algorithm 150 assigns a relatively high priority weight to the "color" attribute for items in the "shoes" category. In some instances, relatively higher (or lower) weights are assigned to items that were previously assigned relatively higher (or lower) weights, such as by the user or one or more other users. In some other instances, the priority weights are based in part on information in the user's configuration data or one or more instructions from the user.

The optimization algorithm 150 is also used in conjunction with the NLP model 160 to select ones of the attributes for inclusion in a set of optimum attributes for uniquely identifying (at least one category of) items. In some instances, the optimum attributes are selected in accordance with the priority weights, where a relatively higher priority weight correlates to a relatively higher priority for inclusion in the set of optimum attributes, and vice versa. In a non-limiting example, the system 100 determines that the "color" attribute is relatively effective for distinguishing the user's items in the "shirts" category (such as if said items are of a wide variety of colors), and thus include the "color" attribute among the optimum attributes for the items in the "shirts" category. In another example, the system 100 determines that the "color" attribute is relatively ineffective for distinguishing the user's items in the "shoes" category (such as if said items are all gray), and thus refrains from including the "color" attribute among the optimum attributes for the items in the "shoes" category.

The optimization algorithm 150 is also used in conjunction with the NLP model 160 to determine a most effective number of the optimum attributes to use in identifying a given set of items. In a non-limiting example, the system 100 determines that the optimum number of attributes to use for identifying items in the "shirts" category is four, and thus uses values extracted for the four highest priority attributes for the "shirts" category, such as "color," "size," "style," and "material." In another example, the system 100 determines that the optimum number of attributes to use for identifying items in the "shoes" category is three, and thus uses values extracted for the three highest priority attributes for the "shoes" category, such as "type," "color," and "size." In some implementations, the optimum attributes and/or number of attributes are selected based on the user's instructions. In some instances, the system 100 provides the user with a plurality of recommended attributes (such as a K most effective attributes for the items or category of items), and the user selects from the recommended attributes and/or adds one or more additional attributes.

The optimization algorithm 150 is also used in conjunction with the NLP model 160 to map an optimum code to each unique value extracted or determined for the selected optimum attributes. In some implementations, the codes are generated by removing one or more characters from the extracted or determined attribute values. In non-limiting examples, the NLP model 160 removes consonants (e.g., "green" becomes "grn"), a number (e.g., 3) of initial characters (e.g., "blue" becomes "blu"), a number (e.g., 3) of unique consonants (e.g., "cotton" becomes "ctn"), or the like. It is to be understood that, in various implementations, the codification technique is any suitable character manipulation technique approved by the user, such as extracting a first character from a last number (e.g., 4) of words excluding a specified set of insignificant words (e.g., 'the,' 'of,' 'a,' or the like)—or else, if four characters are not extracted, extracting a first number (e.g., 2) of characters from the right-most words, retaining order, until a specified number (e.g., 4) of characters is extracted, and otherwise, obtain a custom value (e.g., "the wizard of oz" does not include four "significant" words for this example, and thus, is codified as "wioz"), or the like. In some instances, one or more of the optimum codes is selected from a master dictionary defining codes previously mapped to the same unique values, such as by one or more other users. In a non-limiting example, the master dictionary maps the code "BLU" to the value "blue" for the "color" attribute of items in a "shirts" category. In some other instances, one or more of the optimum codes is retrieved from the user's custom dictionary defining codes previously mapped to the same unique values, such as by the user. In yet other instances, the system 100 solicits (e.g., via the interface 120) one or more custom codes from the user, such as if one or more of the unique values are not defined in at least one of the dictionaries and/or if the user indicates a preference to customize or replace one or more of the codes.

The optimization algorithm 150 is also used in conjunction with the NLP model 160 to balance a conciseness of the optimum codes (i.e., a number of characters) with a readability of the optimum codes, such as based on one or more outputs from the optimization algorithm 150 and the NLP model 160. In a non-limiting example, the unique value for an item's "material" attribute is "cotton," and a code "CT" is deemed more concise than a code "CTN," while the code "CTN" is deemed more readable than the code "CT." In some instances, the system 100 solicits (e.g., via the interface 120) a preference from the user as to whether (and to what extent) to prioritize conciseness over readability for a given set of items or item categories. In a non-limiting example, the system 100 determines that the optimum number of characters to include in codes mapped to values of the "color" attribute (e.g., for items in the "shirt" category) is one, such as if each of the "shirt" items is one of a small number of colors with distinct characters (e.g., red "R", green "G", blue "B", and purple "P"). For this example, the user indicates a preference to balance readability over conciseness; thus, the system 100 uses two characters for the "color" codes, such as red "RD", green "GR", blue "BL", and purple "PR." In another non-limiting example, the system 100 determines that the optimum number of characters is three, such as if each of the "shirt" items is one of a wide variety of colors with some similar characters (e.g., red "RED", green "GRN", gray "GRY", blue "BLU", black "BLK", and brown "BRN") and/or if the values of a different optimum attribute (e.g., "theme") uses similar characters (e.g., rodeo "RDO", grit "GRT", blaze "BLZ", pearl "PRL"). For this example, the user elects to prioritize conciseness over readability for "color" codes, and elects to prioritize readability over conciseness for "theme" codes; thus, the system 100 uses two characters for "color" codes and three characters for "theme" codes. In some instances, the system 100 obtains one or more custom codes from the user, such as if one of the unique values is not defined in at least one of the dictionaries or if the user indicates a preference to submit, modify, or replace a code. In some implementations, the system 100 stores newly mapped codes in the custom dictionary.

The optimization algorithm 150 is also used in conjunction with the NLP model 160 to determine an optimum order in which to arrange the optimum codes in the IDs for a given set of items. In a non-limiting example, the optimum attributes selected for a user's items in a "clothing" category include "size," "color," "custom code," and "type," and the system 100 determines that the optimum order in which to arrange the codes is "type," then "color," then "size," and then "custom code," such as based on the attributes' priority weights, one or more instructions from the user, the user's configuration data, and/or one or more orders used for the same attributes by other users.

The formatting model 170 is used to generate an optimum format for identifying a given set of items. The optimum format defines an optimum ID for each item that arranges, in the optimum order, the optimum codes mapped to the values for the item's optimum attributes. In a non-limiting example, the optimum ID format for items in the user's "shirts" category arranges the optimum codes mapped to values of the "type," "color," "size," and "custom code" attributes, in order. For this example, if said values for a particular item include "sock," "green," "small," and "FW-RJ04," and the corresponding optimum codes are "SK," "GN," "SML," and "RJ04," respectively, the formatting model 170 generates the optimum ID as a suitable sequence of characters including at least said optimum codes in said optimum order, such as "SK-GN-SML-RJ04," "SKGNSML-RJ04," "SKGNSMLRJ04," "SK-GN-SML_RJ.04," or the like. In some instances, the optimum format includes one or more reserved or "placeholder" characters for use in a subsequent session, such as if the user later decides to modify, add, or remove one or more codes or attributes in the item ID format. In a non-limiting example, a placeholder character ('x') is added to the item ID format, such that "SK-GN-SML-RJ04" becomes "SK-GN-SML-RJ04x."

In some implementations, the formatting model 170 uses the optimum format(s) to generate optimum IDs for each of the relevant items, and provides the optimum IDs to the user (e.g., via the interface 120) and/or the database 130, descriptions database 134, or training engine 180 for further training. In some instances, the optimum IDs are added to the user's configuration data, which also includes, in various implementations, the optimum format for the user's items, the user's custom dictionary, the user's custom categories, and/or one or more of the user's instructions. Thereafter, upon obtaining descriptions for one or more new items, the formatting model 170 generates (e.g., in at least near real-time) optimum IDs for the new items in accordance with the relevant optimum formats, e.g., as defined in the user's configuration data. In some instances, in processing the new items' descriptions, the formatting model 170 determines that modifying the optimum codes, attributes, or order will result in one or more enhanced formats defining IDs even more effective for distinguishing the items, such as IDs significantly more concise and/or readable. In various of such instances, the formatting model 170 recommends that the user apply such modifications and, upon approval, uses the new optimum format to generate new IDs for the associated items.

The training engine 180 is used to train the formatting model 170 to (more accurately) extract values for predefined attributes from a given set of item descriptions. In some instances, the training engine 180 recursively and/or iteratively increases an accuracy at which the formatting model 170 extracts the correct values for the particular attributes, such as by obtaining values extracted (e.g., from one or more sample descriptions) using the NER engine 140, obtaining confidences associated with the extracted values (e.g., from the corresponding AVPs), comparing the extracted values with labels indicating the actual values (and/or locations of the actual values in the sample descriptions), and generating enhanced training data based on an accuracy of the extracted values (and/or locations from where the values were extracted). In some instances, the sample descriptions describe items associated with other users and are labeled in the table of predefined attributes. In some instances, the training engine 180 provides the processed item descriptions as training data to the descriptions database 134, where each item description is annotated to indicate the values extracted for the item's attributes and/or the optimum ID generated for the described item. In some instances, the descriptions are also annotated to indicate one or more instructions, refined descriptions, and/or replacement values obtained from the user during processing of the description. In some implementations, the training engine 180 refrains from annotating a given description until the ID generated for the corresponding item is deemed "adopted" by the user, such as by being in active use for at least a minimum duration. In a non-limiting example, an item ID is in "active use" if the user accesses or views the ID (or otherwise interacts with the item) and does not change the ID for at least one month after the ID is assigned to the item. In this manner, the training engine 180 increases a likelihood of the formatting model 170 generating IDs likely to be adopted by users, and decreases a likelihood of the formatting model 170 generating IDs less likely to be adopted by users.

In various implementations, the trained formatting model 170 incorporates one or more aspects of, for example, a classification model, a regression model, random forests, logistic regression, one or more decision trees, nearest neighbors, classification trees, control flow graphs, support vector machines, naïve Bayes, Bayesian Networks, value sets, hidden Markov models, or neural networks configured to generate predictions for the intended purpose. In some aspects, the formatting model 170 incorporates aspects of a neural network of a suitable type, such as a feedforward neural network or a recurrent neural network. In some examples, the formatting model 170 incorporates aspects of a deep neural network (DNN) having a suitable architecture, such as a feedforward architecture or a recurrent architecture. In some other implementations, the formatting model 170 incorporates aspects of a forecasting model such that relevant values are generated based at least in part on previous values associated with one or more input features, including interaction input features. Example forecasting models include one or more of an autoregressive (AR) model or a window function. Example AR models to predict values from time series data include an autoregressive integrated moving average (ARIMA) model, a prophet model, or an exponential smoothing model. Non-limiting example window functions include a simplified moving average, an exponential moving average, stochastic based smoothing, or a naive forecasting model. In some instances, predictions by an example window function are based on one or more of a mean, a minimum, or a maximum of a predefined number of values in a time series data preceding a predicted value.

The NER engine 140, the optimization algorithm 150, the NLP model 160, the formatting model 170, and/or the training engine 180 are implemented in software, hardware, or a combination thereof. In some implementations, any one or more of the NER engine 140, the optimization algorithm 150, the NLP model 160, the formatting model 170, or the training engine 180 is embodied in instructions that, when executed by the processor 110, cause the system 100 to perform operations. In various implementations, the instructions of one or more of said components, the interface 120, and/or the descriptions database 134, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples of generating an optimum format for identifying items and/or training a model to extract attribute values from an item's description are described with reference to the system 100, other suitable system configurations may be used.

Figure 2:
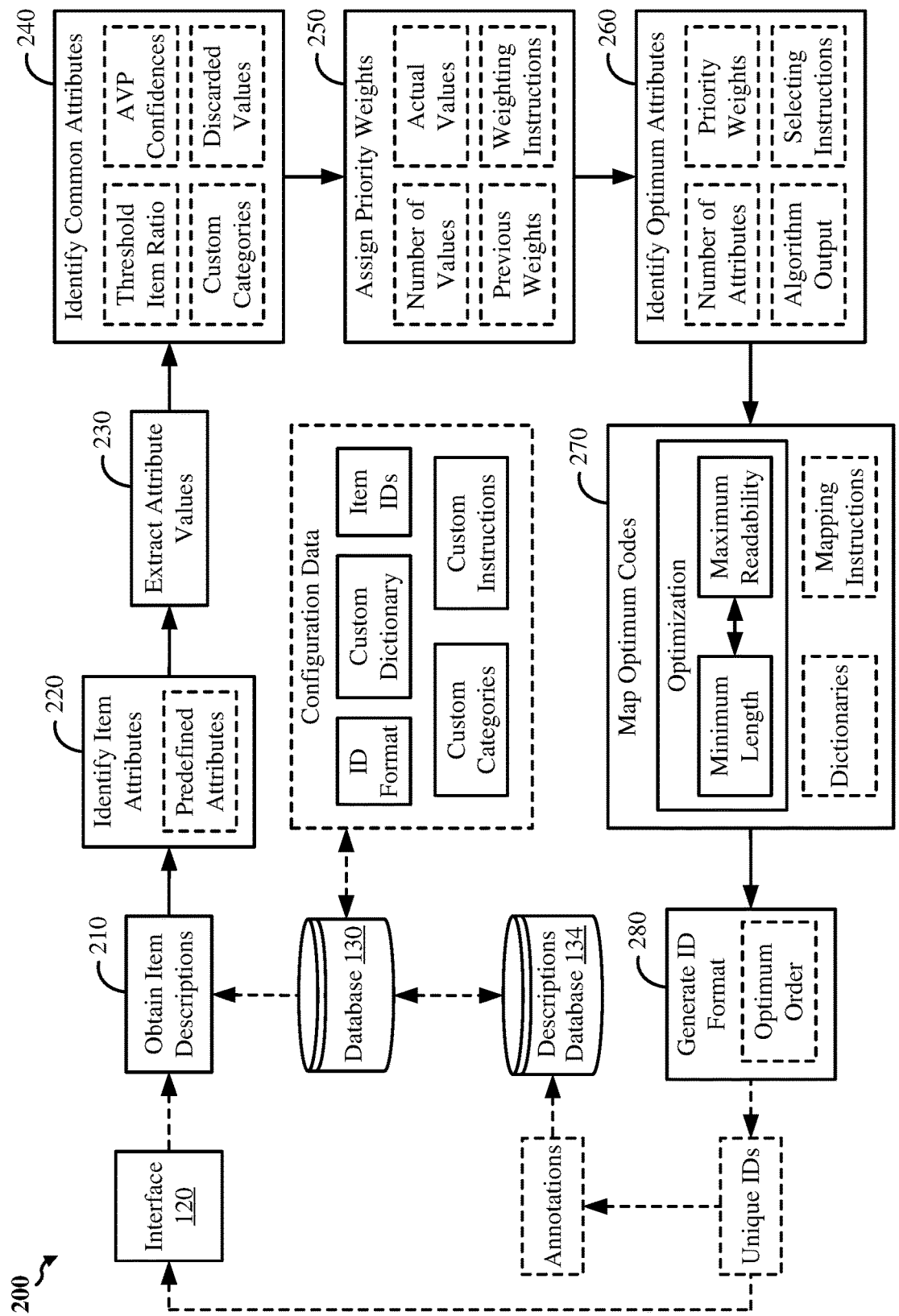
FIG. 2 shows a high-level overview of an example process flow employed by a system, according to some implementations.

FIG. 2 shows a high-level overview of an example process flow 200 employed by a system, according to some implementations, during which a model (e.g., the formatting model 170) generates an optimum format for identifying items. In various implementations, the system incorporates one or more (or all) aspects of the system 100. In some implementations, various aspects described with respect to FIG. 1 are not incorporated, such as the training engine 180.

At block 210, the system 100 obtains one or more item descriptions, such as from the database 130 or from a user via the interface 120.

At block 220, the system 100 identifies (or otherwise predicts) locations of relevant attributes of the items described in the descriptions. In some implementations, the locations are identified using a NER engine, e.g., the NER engine 140. In some instances, the relevant attributes are predefined, such as within data stored in the database 130 or the user's configuration data.

At block 230, the system 100 extracts a value for each of the identified attributes. In some implementations, the values are extracted using a NER engine, such as the NER engine 140. In some instances, the system 100 extracts values for a subset of the identified attributes, such as one or more attributes deemed most relevant to the item or the item's category using an NLP model, e.g., the NLP model 160.

At block 240, the system 100 identifies, among the identified attributes, common attributes for which values were extracted for more than a threshold ratio of the items. In some implementations, the system 100 determines, for each value extracted for one of the common attributes, a confidence that the extracted value is representative of the item's corresponding attribute. In some instances, each item is associated with a particular category, such as a custom category indicated by a user via the interface 120, stored in the database 130, included in the user's configuration data, or identified in the item's description, and the system 100 identifies common attributes for each respective category. In some instances, the system 100 predicts a category for each item and discards predictions associated with a confidence below a value. In such implementations, the system 100 obtains (e.g., from the user) at least one of a replacement value for the discarded values and/or refined descriptions for the associated items.

At block 250, the system 100 assigns priority weights to the common attributes using an optimization algorithm, e.g., the optimization algorithm 150. In some implementations, relatively higher weights are assigned to attributes for which values were extracted from a relatively high ratio of the descriptions or to attributes previously assigned relatively high weights, and relatively lower weights are assigned to attributes for which values were extracted from a relatively small ratio of the descriptions or to attributes previously assigned relatively low weights.

At block 260, the system 100 identifies, among the common attributes, optimum attributes deemed most effective for uniquely identifying the items, at least within each category of items. In some implementations, the optimum attributes are selected based on the priority weights, an instruction from the user, information included in the user's configuration data, and/or one or more outputs of an optimization algorithm, e.g., the optimization algorithm 150.

At block 270, the system 100 maps an optimum code to each unique value extracted for one of the optimum attributes. In some implementations, one or more of the optimum codes is retrieved from a master dictionary, information included in the user's configuration data (e.g., a custom dictionary), or both. In some instances, one or more of the optimum codes is generated based on an instruction from the user, an output of an NLP model (e.g., the NLP model 160), and/or an output of an optimization algorithm (e.g., the optimization algorithm 150). In some aspects, the NLP model predicts a relative readability of each code, the optimization algorithm determines a minimum number of characters for each code to be unique, and each code is formatted such that a readability of the code is maximized (at least to the user's preferred readability) and a length of the code is minimized (at least to the user's preferred length).

At block 280, the system 100 generates an ID format that defines, for each of the items, a unique ID including the optimum codes mapped to the values of the item's optimum attributes. In some implementations, the system 100 determines an optimum order in which to arrange the optimum codes, such as based on the priority weights.

In some implementations, after block 280, the system 100 generates a unique ID for each of the items in accordance with the ID format. In some instances, the system 100 provides one or more of the unique IDs to the user, such as via the interface 120. In addition, or in the alternative, one or more of the descriptions are annotated and provided to the descriptions database 134 for further training, such as after the corresponding unique IDs are used for more than a minimum amount of time. In various implementations, at least one of the ID format, unique IDs, custom dictionary, user instructions, or custom categories are added to the user's configuration data. In some instances, the system 100 obtains one or more descriptions of new items associated with the user, and uses the ID format to generate a unique ID for each new item.

Figure 3:
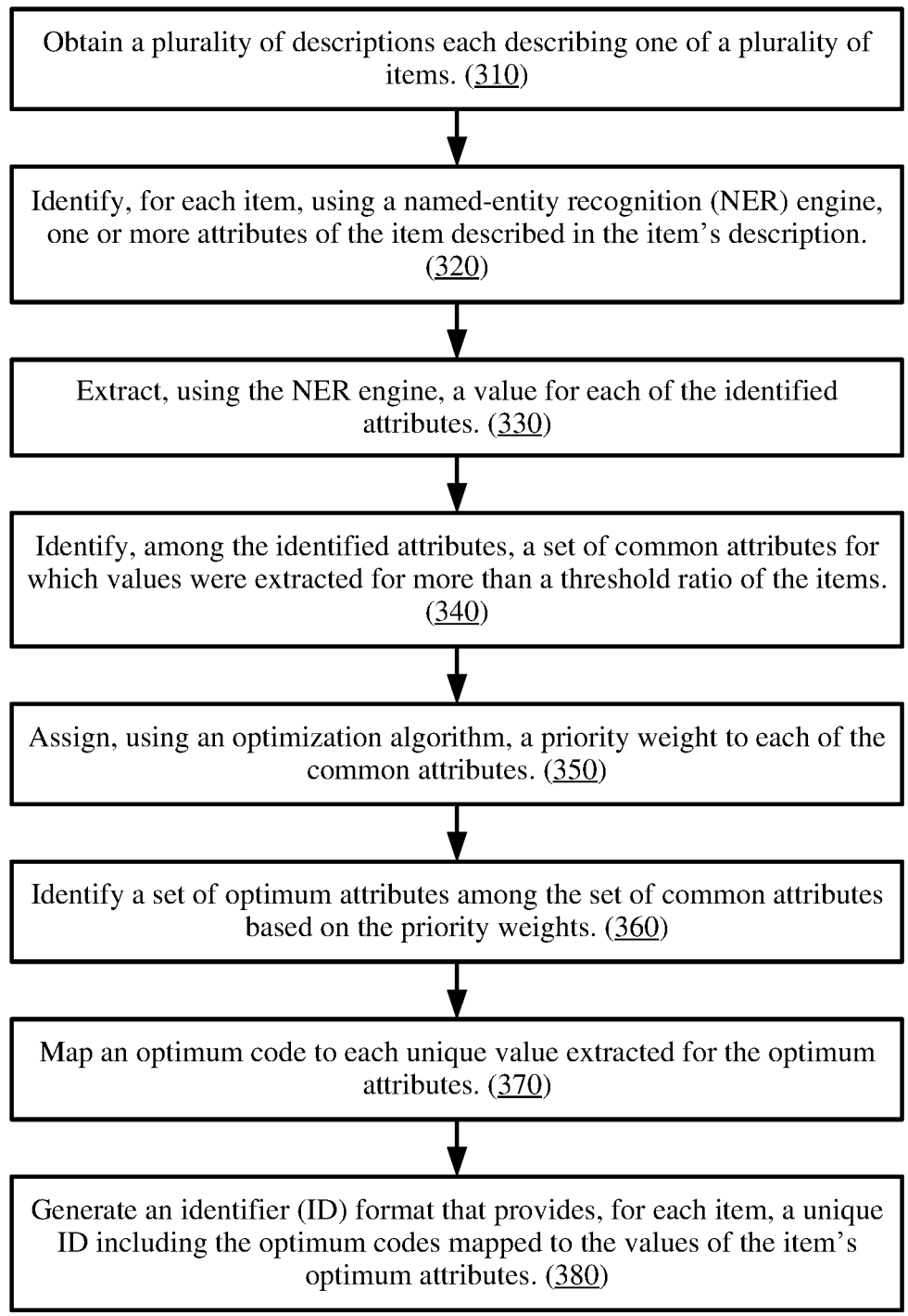
FIG. 3 shows an illustrative flowchart depicting an example operation for generating an optimum format for identifying items, according to some implementations.

FIG. 3 shows a high-level overview of an example process flow 300 employed by the system 100 of FIG. 1 and/or the system described with respect to FIG. 2, according to some implementations, during which a model generates an optimum format for identifying items. At block 310, the system 100 obtains a plurality of descriptions each describing one of a plurality of items. At block 320, the system 100 identifies for each item, using a NER engine, one or more attributes of the item described in the item's description. At block 330, the system 100 extracts, using the NER engine, a value for each of the identified attributes. At block 340, the system 100 identifies, among the identified attributes, a set of common attributes for which values were extracted for more than a threshold ratio of the items. At block 350, the system 100 assigns, using an optimization algorithm, a priority weight to each of the common attributes. At block 360, the system 100 identifies a set of optimum attributes among the set of common attributes based on the priority weights. At block 370, the system 100 maps an optimum code to each unique value extracted for the optimum attributes. At block 380, the system 100 generates an ID format that provides, for each item, a unique ID including the optimum codes mapped to the values of the item's optimum attributes.

Figure 4:
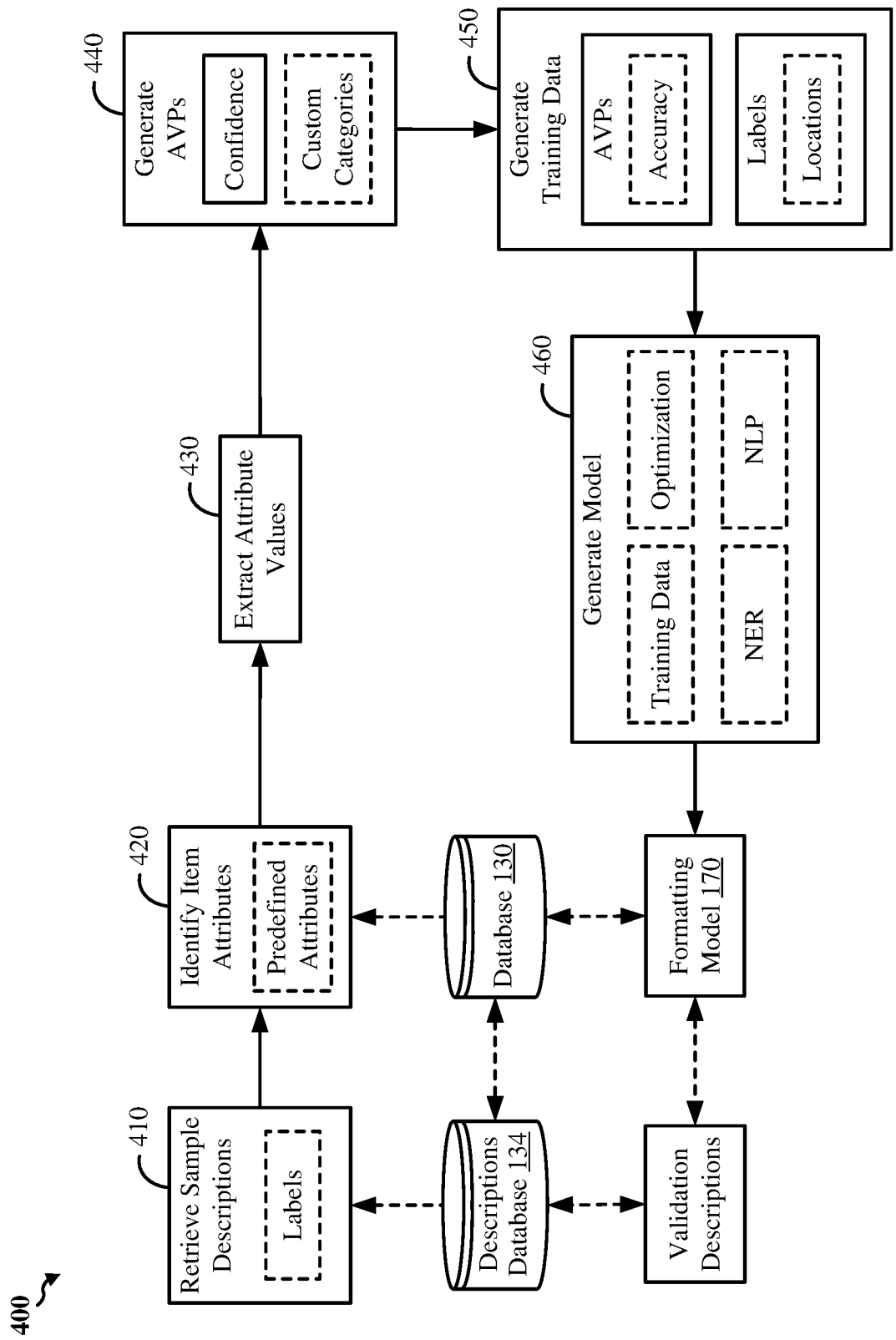
FIG. 4 shows a high-level overview of an example process flow employed by a system, according to some implementations.

FIG. 4 shows a high-level overview of an example process flow 400 employed by a system, according to some implementations, during which a model is trained to extract attribute values from an item's description. In various implementations, the system incorporates one or more (or all) aspects of the system 100. In some implementations, various aspects described with respect to FIG. 1 are not incorporated, such as the interface 120.

At block 410, the system 100 retrieves sample item descriptions from the descriptions database 134. In addition, or in the alternative, the sample item descriptions are retrieved from the database 130, an external database, or another suitable source. In some implementations, each sample description is labeled to indicate locations within the sample description storing values for one or more of the item's relevant attributes.

At block 420, the system 100 identifies (or otherwise predicts) locations of relevant attributes of the items described in the sample descriptions. In some instances, the relevant attributes are predefined, such as by an administrator, one or more annotations, or in the configuration data.

At block 430, the system 100 extracts a value for each of the identified attributes. In some implementations, the system 100 extracts values for a subset of attributes deemed most relevant to the item by an NLP model, such as the NLP model 160.

At block 440, the system 100 generates AVPs for the extracted values. Each AVP indicates one of the attributes, the value extracted for the attribute, and a confidence that the value correctly identifies the attribute for the item. In some instances, each of the items is associated with a particular category, such as a custom category detected within the item's description, predefined by an administrator, detected in one or more similar descriptions, or associated with one or more similar items. In such instances, the system 100 generates an additional AVP for each item indicating the item's category and a confidence that the value correctly identifies the item's category. In some other instances, the system 100 refrains from generating an additional AVP for the "category" attribute, such as if the "category" attribute is not included within the set of optimum attributes for the particular set of items.

At block 450, the system 100 generates model training data based on a comparison of the AVPs and labels for the corresponding descriptions. In some implementations, each label indicates an actual value of the attribute associated with the AVP, an actual location in the item's description storing the value, or both. In some aspects, generating the model training data includes determining an accuracy at which the extracted values match the actual values and/or an accuracy at which the locations from which the values were extracted match the actual locations.

At block 460, the system 100 uses the training data to generate a formatting model, such as the formatting model 170. In some implementations, the training engine 180 is used to train the formatting model 170 until an accuracy at which the formatting model 170 extracts correct attribute values from descriptions reaches a desired extent. Thereafter, the formatting model 170 is recursively and/or iteratively optimized until the accuracy reaches a new desired extent. In some implementations, validation descriptions are used to validate, further train, or otherwise optimize the formatting model 170 to further increase its accuracy.

In some implementations, once trained, the formatting model 170 is used to generate an optimum ID for each item of a given set of items, where each optimum ID is a unique sequence of codes (at least within the item's category) including a minimum number of characters for representing, in a most effective order, the values for a minimum number of the item's (or category's) attributes deemed most effective for distinguishing the item from other items (at least within the category) and for maximizing a predicted readability of the ID. In some instances, the system 100 provides one or more of the optimum IDs, predicted values, or confidences to the database 130, the descriptions database 134, or another suitable data store, for further training.

Figure 5:
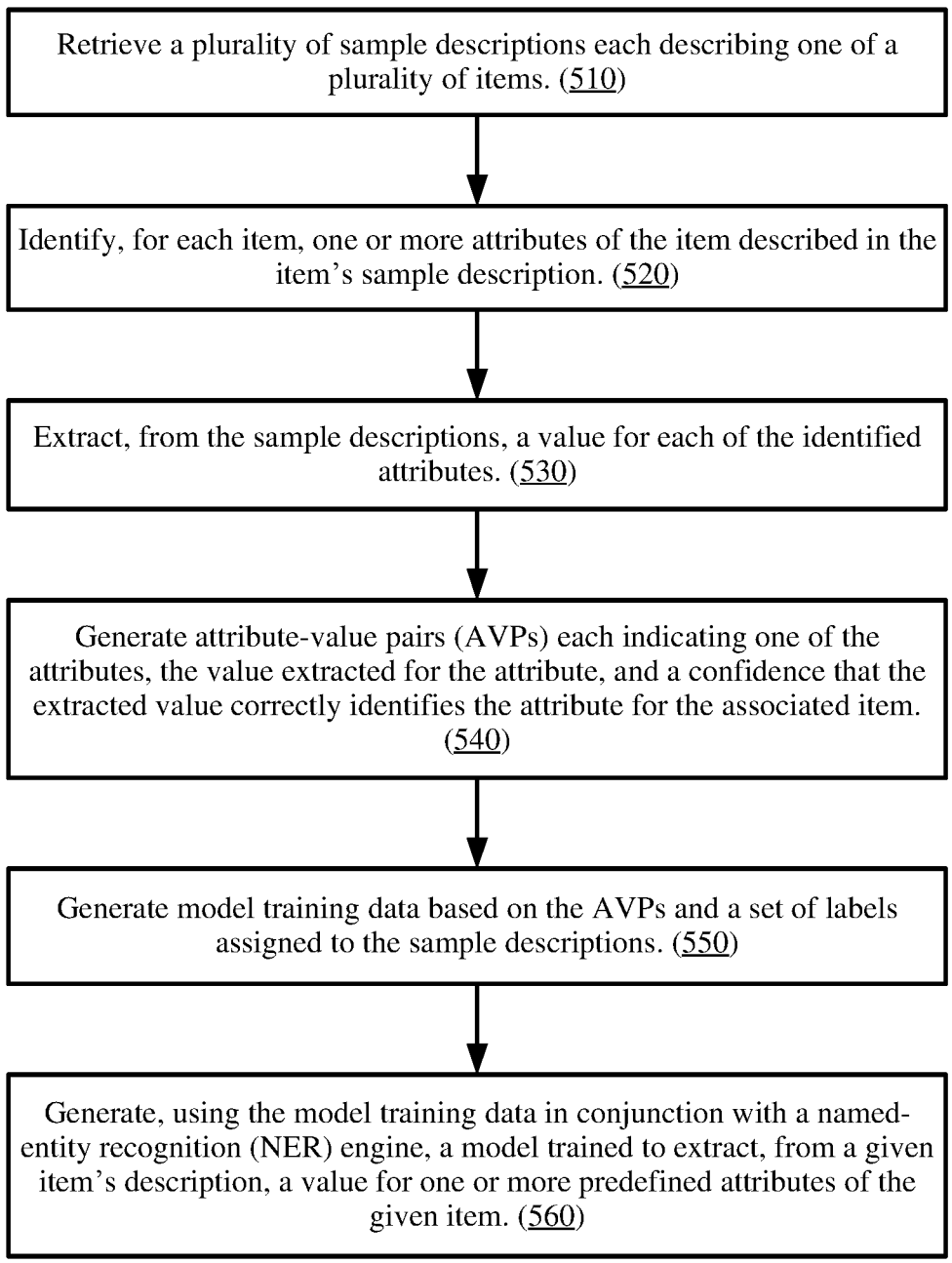
FIG. 5 shows an illustrative flowchart depicting an example operation for training a model to extract attribute values from an item's description, according to some implementations.

FIG. 5 shows a high-level overview of an example process flow 500 employed by the system 100 of FIG. 1 and/or the system described with respect to FIG. 4, according to some implementations, during which a model is trained to extract attribute values from an item's description. At block 510, the system 100 retrieves a plurality of sample descriptions each describing one of a plurality of items. At block 520, the system 100 identifies, for each item, one or more attributes of the item described in the item's sample description. At block 530, the system 100 extracts, from the sample descriptions, a value for each of the identified attributes. At block 540, the system 100 generates attribute-value pairs (AVPs) each indicating one of the attributes, the value extracted for the attribute, and a confidence that the extracted value correctly identifies the attribute for the associated item. At block 550, the system 100 generates model training data based on the AVPs and a set of labels assigned to the sample descriptions. At block 560, the system 100 generates, using the model training data in conjunction with a named-entity recognition (NER) engine, a model trained to extract, from a given item's description, a value for one or more predefined attributes of the given item.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for generating an optimum format for identifying items, the method performed by at least one or more processors of a system and comprising:
    obtaining, from memory using the one or more processors, a plurality of descriptions each describing one of a plurality of items;
    identifying for each item, using a trained named-entity recognition (NER) engine, one or more attributes of the item described in the item's description;
    extracting, using the trained NER engine, a value for each of the identified attributes;
    identifying, among the identified attributes using the trained NER engine, a set of common attributes, wherein for each of the common attributes, a ratio between a number of items for which values were extracted for the common attribute and the total number of items exceeds a threshold;
    assigning, using an optimization algorithm executed by the one or more processors and a natural-language processing (NLP) model, a priority weight to each of the common attributes;
    identifying, using the optimization algorithm executed by the one or more processors and the NLP model, a set of optimum attributes among the set of common attributes based on the priority weights;

mapping, using the optimization algorithm executed by the one or more processors and the NLP model, an optimum code to each unique value extracted for the optimum attributes; and generating, using the trained NER engine, an identifier (ID) format that provides, for each item, a unique ID including the optimum codes mapped to the values of the item's optimum attributes.

2. The method of claim 1, wherein each of the one or more attributes is included in a set of predefined attributes including at least one of a category attribute, a type attribute, a size attribute, a color attribute, a rarity attribute, a source attribute, a material attribute, a container attribute, an amount attribute, a design attribute, a theme attribute, a collection set attribute, a level attribute, a quantity attribute, or a custom term attribute.

3. The method of claim 1, further comprising:
generating, for each common attribute using the trained NER engine, an attribute-value pair (AVP) indicating the common attribute, the value extracted for the common attribute, and a confidence that the extracted value correctly identifies the common attribute for the associated item.

4. The method of claim 3, further comprising:
discarding values from AVPs indicating a confidence below a threshold; and
obtaining from a user, for each AVP from which the value was discarded, at least one of a replacement value for the discarded value, a refined description of the item associated with the discarded value, or an instruction to refrain from replacing the value or refining the description.

5. The method of claim 3, wherein each respective item is associated with one of a plurality of custom categories, and the method further comprises:
generating, for each respective item using the trained NER engine, an additional AVP indicating the custom category, a value for the custom category, and a confidence that the value correctly identifies the custom category associated with the respective item.

6. The method of claim 1, wherein the priority weights are assigned based on at least one of a number of values extracted for the common attribute, one or more actual values extracted for the common attribute, one or more weights previously assigned to the common attribute, or one or more instructions from a user.

7. The method of claim 1, further comprising:
selecting, using the trained NER engine, a number of attributes to include in the set of optimum attributes based on at least one of an instruction from a user or an output of the optimization algorithm.

8. The method of claim 1, wherein at least one of an instruction from a user, an output of the optimization algorithm, or an output of a natural-language processing (NLP) model is used to minimize a number of characters in each optimum code while maximizing the optimum code's expected readability.

9. The method of claim 1, wherein at least one of the optimum codes is retrieved from a master dictionary mapping the corresponding unique value to a previously used code.

10. The method of claim 1, further comprising:
determining an optimum order in which to arrange the optimum attributes based on at least one of an instruction from a user or the priority weights.

11. The method of claim 1, further comprising:

generating, using the ID format, a unique ID for each item;
obtaining one or more descriptions for new items associated with a user; and
generating, using the ID format, a unique ID for each new item different than any of the unique IDs assigned to the user's other items.

12. The method of claim 1, further comprising:
generating configuration data for a user including at least one of the generated ID format, a set of custom categories for the user's items, a custom dictionary defining ones of the optimum codes, or one or more instructions from the user, wherein the unique IDs are unique across each of the custom categories.

13. The method of claim 1, further comprising:
annotating one or more of the descriptions based on at least one of an instruction from a user, a replacement value from the user, or a refined description from the user, wherein a given item's description is annotated after the unique ID is in active use for the given item for more than a minimum amount of time.

14. A system for generating an optimum format for identifying items, the system comprising:
one or more processors; and
at least one memory coupled to the one or more processors and storing instructions that, when executed by the one or more processors, cause the system to perform operations including:
obtaining, from memory, a plurality of descriptions each describing one of a plurality of items;
identifying for each item, using a trained named-entity recognition (NER) engine, one or more attributes of the item described in the item's description;
extracting, using the trained NER engine, a value for each of the identified attributes;
identifying, among the identified attributes using the trained NER engine, a set of common attributes, wherein for each of the common attributes, a ratio between a number of items for which values were extracted for the common attribute and the total number of items exceeds a threshold;
assigning, using an optimization algorithm executed by the one or more processors and a natural-language processing (NLP) model, a priority weight to each of the common attributes;
identifying, using the optimization algorithm executed by the one or more processors and the NLP model, a set of optimum attributes among the set of common attributes based on the priority weights;
mapping, using the optimization algorithm executed by the one or more processors and the NLP model, an optimum code to each unique value extracted for the optimum attributes; and
generating, using the trained NER engine, an identifier (ID) format that provides, for each item, a unique ID including the optimum codes mapped to the values of the item's optimum attributes.

15. The system of claim 14, wherein execution of the instructions by the one or more processors causes the system to perform operations further including:
generating, for each common attribute using the trained NER engine, an attribute-value pair (AVP) indicating the common attribute, the value extracted for the common attribute, and a confidence that the extracted value correctly identifies the common attribute for the associated item.

16. The system of claim 15, wherein execution of the instructions by the one or more processors causes the system to perform operations further including:

discarding values from AVPs indicating a confidence below a threshold; and obtaining from a user, for each AVP from which the value was discarded, at least one of a replacement value for the discarded value, a refined description of the item associated with the discarded value, or an instruction to refrain from replacing the value or refining the description.

17. The system of claim 14, wherein the priority weights are assigned based on at least one of a number of values extracted for the common attribute, one or more actual values extracted for the common attribute, one or more weights previously assigned to the common attribute, or one or more instructions from a user.

18. The system of claim 14, wherein execution of the instructions by the one or more processors causes the system to perform operations further including:

selecting, using the trained NER engine, a number of attributes to include in the set of optimum attributes based on at least one of an instruction from a user or an output of the optimization algorithm.

19. The system of claim 14, wherein execution of the instructions by the one or more processors causes the system to perform operations further including:

determining an optimum order in which to arrange the optimum attributes based on at least one of an instruction from a user or the priority weights.

20. The system of claim 14, wherein execution of the instructions by the one or more processors causes the system to perform operations further including:

generating configuration data for a user including at least one of the generated ID format, a set of custom categories for the user's items, a custom dictionary defining ones of the optimum codes, or one or more instructions from the user, wherein the unique IDs are unique across each of the custom categories.

* * * * *